United States Patent [19]

Overby

[11] Patent Number: 4,925,466
[45] Date of Patent: May 15, 1990

[54] FILTER CARTRIDGE ASSEMBLY

[75] Inventor: Kenneth W. Overby, Hamilton, Ind.

[73] Assignee: La-Man Corporation, Hamilton, Ind.

[21] Appl. No.: 275,773

[22] Filed: Nov. 23, 1988

[51] Int. Cl.⁵ .............................................. B01D 36/02
[52] U.S. Cl. ......................................... 55/319; 55/219;
  55/323; 55/DIG. 17; 55/DIG. 25
[58] Field of Search .................. 55/218, 219, 319-323,
  55/327, DIG. 17, DIG. 25; 210/440, 441, 444

[56] References Cited

U.S. PATENT DOCUMENTS

| | | | |
|---|---|---|---|
| 1,750,632 | 3/1930 | Farmer | 55/DIG. 17 |
| 1,896,833 | 2/1933 | Bramsen et al. | 55/322 |
| 2,050,581 | 8/1936 | Orem | 55/433 X |
| 2,226,045 | 12/1940 | Baldwin | 55/319 X |
| 2,402,140 | 6/1946 | Heintzelman | 55/482 |
| 2,442,696 | 6/1948 | Krieck | 55/319 |
| 2,606,628 | 8/1952 | Hasselwander | 55/319 |
| 2,726,732 | 12/1955 | Faust et al. | 55/219 |
| 2,744,534 | 5/1956 | Faust et al. | 55/219 X |
| 3,246,455 | 4/1966 | Boddy | 55/319 |
| 3,353,339 | 11/1967 | Walter | 55/316 |
| 3,379,312 | 4/1968 | Brown | 210/444 X |
| 3,402,529 | 9/1968 | Frantz | 55/267 |
| 3,791,105 | 2/1974 | Rhodes | 55/322 X |
| 3,876,400 | 4/1975 | Frantz | 55/267 |
| 3,966,437 | 6/1976 | DeWolf et al. | 55/219 |
| 3,980,457 | 9/1976 | Smith | 55/219 |
| 4,067,812 | 1/1978 | Drori | 210/444 X |
| 4,105,561 | 8/1978 | Domnick | 210/444 X |
| 4,336,043 | 6/1982 | Aonuma et al. | 55/218 X |
| 4,385,913 | 5/1983 | Lane | 55/DIG. 17 |
| 4,409,005 | 10/1983 | McKendrick | 55/218 X |
| 4,487,618 | 12/1984 | Mann | 55/323 |
| 4,600,416 | 7/1986 | Mann | 55/323 |
| 4,662,907 | 5/1987 | Yoshida | 55/320 X |
| 4,668,256 | 5/1987 | Billiet et al. | 55/219 |
| 4,692,175 | 9/1987 | Frantz | 55/319 X |
| 4,692,245 | 9/1987 | Church et al. | 210/444 X |

FOREIGN PATENT DOCUMENTS 2194463  3/1988  United Kingdom ......... 55/DIG. 17

OTHER PUBLICATIONS

WO88/02658, PCT Application published on 4/21/88 to Sung.
Wilkerson Corporation, "MICROalescer" Filters Data Sheet No.1 1200.001-01, dated 7/1969, 2 pages.

*Primary Examiner*—Robert Spitzer
*Attorney, Agent, or Firm*—Barnes & Thornburg

[57] ABSTRACT

A modular filter assembly for filtering compressed air includes a cartridge housing and a self-contained filter cartridge positionable in the housing. A manifold cap is attachable to the housing to conduct a compressed air stream between an air line and the filter cartridge in the housing. The filter cartridge includes a multistage filter and a quiet zone between filter elements therein.

32 Claims, 4 Drawing Sheets

FILTER CARTRIDGE ASSEMBLY

BACKGROUND AND SUMMARY OF THE INVENTION

The present invention relates to an apparatus for decontaminating a stream of compressed air or the like by removing unwanted particles, gas, or vapor from the compressed air stream using a single or multistage filter. More particularly, the present invention relates to a point of use modular filter assembly including a cartridge housing, a self-contained filter cartridge positionable in the housing, and a manifold cap attachable to the housing for conducting a compressed air stream between an air line and the filter cartridge in the housing.

Filter elements deployed in filter assemblies must be replaced periodically as the elements become occluded with contaminant material trapped therein or otherwise fail to function properly. Service persons charged with the responsibility of replacing worn filter elements often encounter difficulty or other delay in dismantling a mounted filter assembly to a point where the worn element can be removed from the assembly for replacement. Such problems can result from the complicated, cumbersome filter element-retaining and manifold cap-attachment structures used in many conventional filter assemblies. A filter assembly constructed of easily assembled and disassembled modular components would make the job of filter element replacement much easier and less time-consuming and would avoid shortcomings of conventional compressed air filter assemblies.

One object of the present invention is to provide an easily replaceable, self-contained, modular filter cartridge that is insertable into a protective housing and supportable in a fixed position therein to filter a compressed air stream admitted into the housing.

The utility of a compressed air filter assembly is enhanced by providing the maximum filtering capacity in an assembly having the smallest possible volume. Small air filter assemblies are desired because they are usable in a wide variety of applications where the space available to mount an assembly is at a premium. provision of a compact, modular filter assembly would be an improvement over conventional filter assemblies in which the filter elements are not arranged or configured to minimize the volume or space envelope of the filter element housing.

Another object of the present invention is to increase the filtering capacity of a filter cartridge of constant size by connecting a manifold cap to a filter cartridge housing and by supporting the filter cartridge within its housing without projecting any foreign support members or the like through the body of the filter cartridge.

Contaminant build-up on interior surfaces of filter housings and inside drains used to discharge collected material from filter housings is a problem known to disturb the operation of some conventional filter assemblies. In such cases, it is necessary to disassemble the filter assembly periodically so that it can be cleaned thoroughly. For example, in the cleaning apparatus disclosed in U.S. Pat. No. 3,353,339 to Walter, the interior walls of the filter housing and the drain assembly are exposed to an untreated compressed air stream. Unwanted build-up of contaminant material can occur in that cleaning apparatus because the compressed air stream is allowed to communicate directly with surfaces and components in interior regions of the filter housing before the compressed air stream is introduced into the filter element itself. Development of an improved modular filter assembly in which the filter element communicates directly with the inlet and outlet manifold would advantageously reduce unwanted contaminant build-up inside the filter assembly.

Yet another object of the present invention is to provide a manifold for capping a cartridge housing and a compact filter cartridge positionable in the housing to mate with the manifold cap so that a compressed air stream conducted through the manifold cap toward a point of use is decontaminated in the filter cartridge without allowing the compressed air stream discharged from the manifold cap to contaminate the housing or its liquid drain.

According to the present invention, an apparatus is provided for cleaning a compressed air stream conducted through an air line. The apparatus includes a cartridge housing formed to include an interior region and a cartridge-receiving opening communicating with the interior region. A filter cartridge is disposed in the interior region of the cartridge housing. The filter cartridge includes means for filtering a compressed air stream to remove at least one selected contaminant therefrom.

A manifold is formed to include means interconnecting the air line and the filter cartridge for conducting the compressed air stream in the air line between the air line and the filter cartridge. Means is provided for selectively connecting the manifold to the cartridge housing to cover the cartridge-receiving opening and to place the manifold adjacent to the filter cartridge so that the conducting means is coupled to the filtering means. The entire connecting means is situated to lie in spaced-apart relation to the filter cartridge so that the connecting means extends about the filter cartridge upon connection of the manifold to the cartridge housing to maximize the interior filter-containing region of the cartridge housing.

In preferred embodiments, the filtering means includes a pair of coaxially aligned filter elements. A first of the filter elements is formed to include a central aperture extending in an axial direction therethrough. A second of the filter elements is situated in the central aperture of the first filter element.

The apparatus further includes means for retaining the filter cartridge in a predetermined position in the interior region of the cartridge housing adjacent to the manifold and in spaced-apart relation to the connecting means. In this predetermined position, the filtering means of the filter cartridge is in fluid communication with the conducting means of the manifold to permit a compressed air stream diverted from the air line to be cleaned in the filter cartridge without contaminating interior regions or drains of the apparatus. The retaining means is configured to permit removal of the filter cartridge from the interior region of the cartridge housing through the cartridge-receiving opening upon disconnecting the manifold from the cartridge housing.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
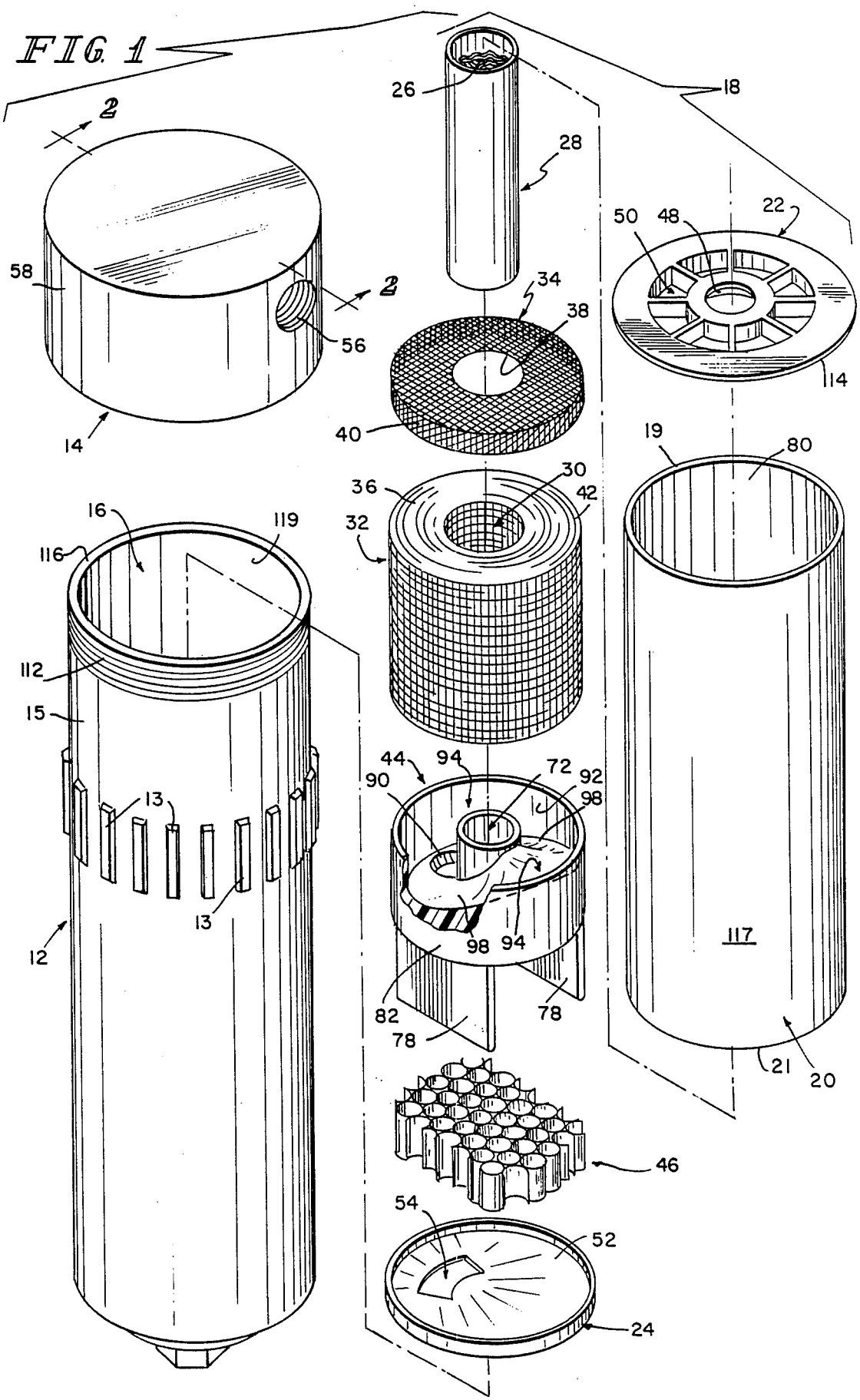
FIG. 1 is an exploded assembly view of components comprising one preferred embodiment of a filter cartridge assembly in accordance with the present invention.
Figure 2:
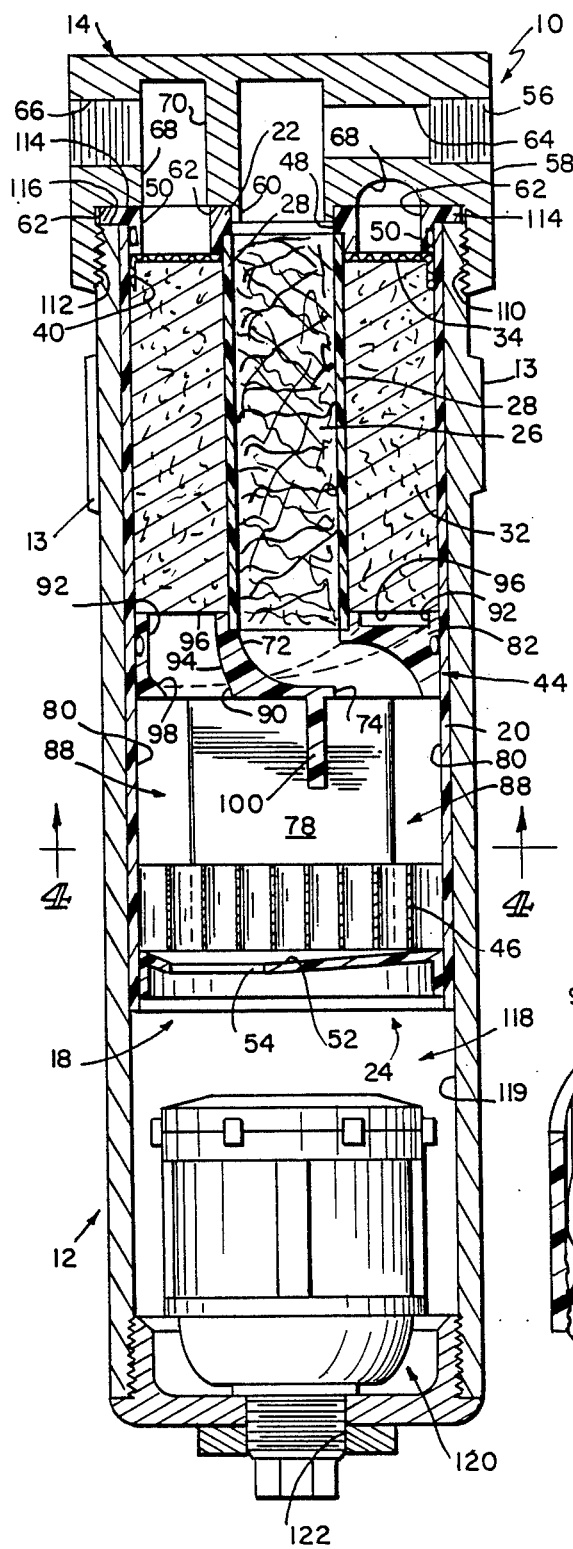
FIG. 2 is a longitudinal sectional view of a fully assembled filter cartridge assembly taken along lines 2—2 of FIG. 1 showing a filter cartridge containing multistage coaxial filters and a quiet zone wherein the filter cartridge is suspended inside a cartridge housing to communicate directly with a manifold cap attached to the housing.

Referring to FIGS. 1 and 2, one preferred embodiment of a filter cartridge assembly 10 includes a cartridge housing 12, a manifold cap 14 for closing a cartridge-receiving opening 16 in cartridge housing 12, and a filter cartridge 18 insertable as a single unit into an interior region of the housing 12 to be captured therein by manifold cap 14. The cartridge housing 12 includes a plurality of vertical ribs 13 spaced about the circumference of the exterior wall 15 of the housing 12 to permit a user to grip the housing 12 more easily during connection of manifold cap 14 to the housing 12.

The filter cartridge 18 includes an open-ended tubular casing 20 closed at an axially upper end 19 by casing lid 22 and at an axially lower end 21 by casing bottom 24. A first stage filter 26 is held inside a tubular filter partition 28 which is disposed in an axially extending central aperture 30 formed in second stage filter 32. An annular exit screen 34 rests on the top face 36 of second stage filter 32 and is formed to include a central aperture 38 for receiving tubular filter partition 28 and a circumferentially extending skirt 40 surrounding the exterior side wall 42 of second stage filter 32.

The filter cartridge 18 further includes an airflow distributor member 44 underneath the first and second stage filters 26, 32 in an axially lower interior region of the tubular casing 20. Airflow distributor member 44 is configured to help conduct a stream of compressed air from an outlet of the first stage filter 26 to an inlet of the coaxially aligned second stage filter 32.

A honeycomb structure 46 is positioned in filter cartridge 18 underneath airflow distributor member 44 to collect droplets generated by a vapor-coalescing medium in the first stage filter 26 in a quiet zone of substantially zero air movement. The honeycomb structure 46 acts to minimize revaporization of droplets in air conducted through the enclosed volume in the filter cartridge 18 situated between the airflow distributor member 44 and the honeycomb structure 46. Reference is hereby made to U.S. Pat. No. 4,487,618 to Mann for a description of a honeycomb structure suitable for use in providing a quiet zone in tubular casing 20. It is necessary to replace honeycomb structure 46 periodically because oils entrained in the compressed air stream attack the generally polycarbonate honeycomb structure 46 and destroy it.

Casing lid 22 is formed to include a central inlet port 48 for admitting an untreated compressed air stream into the tubular casing 20 and a plurality of radially outwardly extending, circumferentially spaced-apart outlet ports 50 surrounding the central inlet port 48 for discharging a compressed air stream from the tubular casing 20 following treatment therein. Thus, filter cartridge assembly 10 is configured so that the compressed air stream enters and exits the filter cartridge 18 at the top thereof through apertures provided in casing lid 22.

Casing bottom 24 includes a funnel-shaped bottom wall 52 formed to include a drainage port 54 at its lowest point. Droplets collected in honeycomb structure 46 flow into the funnel defined by bottom wall 52 and are discharged from filter cartridge 18 through drainage port 54.

As shown in FIG. 2, manifold cap 14 includes an inlet opening 56 formed in side wall 58 and a manifold exit port 60 formed in the center of bottom wall 62. The untreated compressed air stream introduced into inlet opening 56 is conducted to manifold exit port 60 through an L-shaped inlet passageway 64 formed in the manifold cap 14 to interconnect the inlet opening 56 and manifold exit port 60 in fluid communication. The untreated compressed air stream discharged from manifold cap 14 via manifold exit port 60 is admitted directly into the first stage filter 26 because of the mutually confronting alignment of central inlet port 48 in casing lid 22 and manifold exit port 60 as shown best in FIG. 2.

Manifold cap 14 also includes an outlet opening 66 formed in side wall 58 in circumferentially spaced-apart relation from inlet opening 56 and an annular manifold entry port 68 formed in bottom wall 62 to surround manifold exit port 60. The filtered compressed air stream is filtered again by mesh exit screen 34 as it leaves second stage filter 32, discharged from the second stage filter 32 through the annular array of outlet ports 50 in the casing lid 22, and then admitted into the manifold cap 14 via the annular manifold entry port 68. The manifold cap 14 is also formed to include a funnel-like outlet passageway 70 interconnecting the annular manifold entry port 68 and the outlet opening 66 without intersecting the inlet passageway 64.

It will be understood that untreated compressed air can enter first stage air filter 26 via manifold exit port 60 and lid inlet port 48 and also exit second stage filter 32 via the ring of lid outlet ports 50 and annular manifold entry port 68 regardless of the relative rotational position of the rotatably mounted manifold cap 14 with respect to the cartridge housing 12 and filter elements 26, 32 therein. Accordingly, it is only necessary to screw or otherwise connect the manifold cap 14 onto housing 12 while filter cartridge 18 is positioned therein to couple the manifold cap 14 and filter cartridge 18 in fluid communication. This alignment feature would also exist if a spin-on, quick-release, or press-fit means was employed to connect manifold cap 14 to housing 12 as shown, for example, in the embodiments of FIGS. 5-7.

The first stage filter 26 is a coalescer which functions to demoisturize a compressed air stream conducted therethrough by promoting coalescence of vapor in the compressed air stream. For example, first stage filter 26 can be made of stainless steel wool, stainless steel scrubble pad, stainless steel waffle knit, or the like. Reference is hereby made to U.S. Pat. No. 4,487,618 to Mann for a description of a suitable coalescer material. Vapor in the compressed air stream is coalesced in first stage filter to form liquid droplets which fall under gravity through the airflow distributor 44 toward the honeycomb structure 46 underlying the airflow distributor member 44.

The second stage filter 32 is a depth filter which functions to remove selected contaminants from the compressed air stream. For example, clay-type absorbent material may be used to effect oil removal, while a cotton and stainless steel pack may be used to effect water and particle removal. The radially outer second stage depth filter 32 is configured to surround the radially inner first stage coalescer to add more filtering area to the filter cartridge 18 and to create less flow and assembly restrictions. Moreover, a higher percentage of the available space inside filter cartridge 18 is used by mounting the first stage filter 26 in the central aperture 30 formed in the second stage filter 32. One advantage of the annular shape of filter 32 is that it improves the manufacturability of the filter assembly 10 over conventional designs by eliminating tight wrap of filter cloth.

The airflow distributor member 44 is mounted in the tubular casing 20 underneath the filters 26, 32 to establish a flow path in the tubular casing 20 for the compressed air stream as it exits from the first stage filter 26 as shown best in FIG. 2. Air flow distributor member 44 is formed to include a top-opening central inlet port 72, a bottom-opening outlet port 74, and a first stage exit channel 76 extending therebetween. The first stage exit channel 76 is somewhat S-shaped in cross section as shown in FIG. 2 and conducts the compressed air stream and liquid droplets filtered therefrom in the first stage coalescer filter 26 to a radially outer portion of the interior region of the tubular casing 20.

Figure 4:
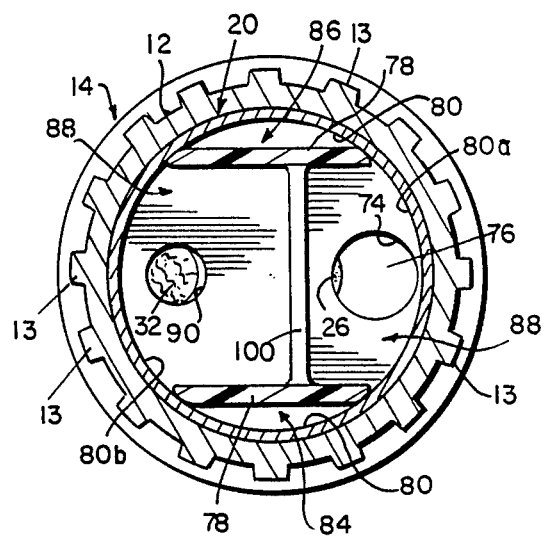
FIG. 4 is a transverse sectional view of the embodiment of FIGS. 1-3 taken along lines 4—4 to show the underside of the airflow distributor member illustrated in FIGS. 1-3.
Figure 3:
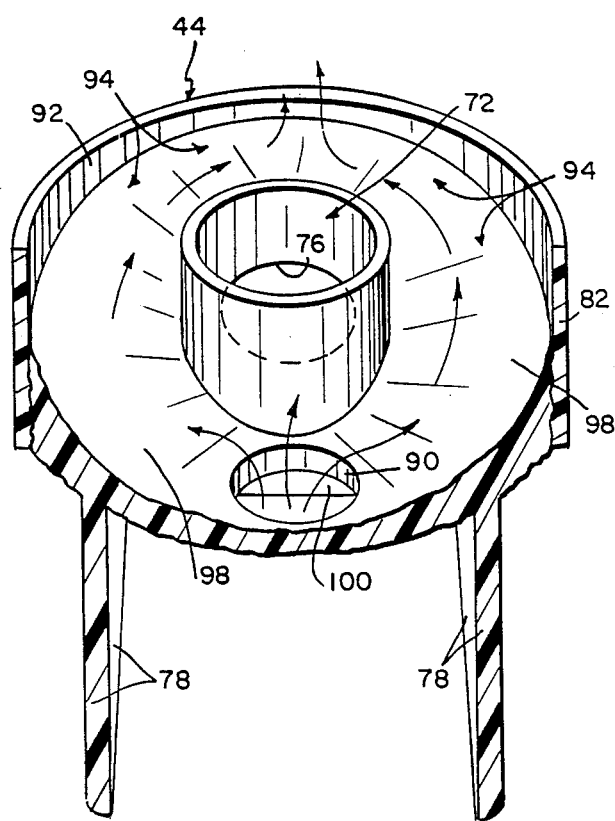
FIG. 3 is a perspective view of the airflow distributor member of FIG. 1, with portions broken away to reveal the contoured, inclined flow path for conducting the compressed air stream from the quiet zone into the second stage filter.

The airflow distributor member 44 includes a pair of flat axially downwardly extending side walls 78 aligned in spaced-apart parallel relation as shown best in FIGS. 1, 3, and 4. Upon insertion of airflow distributor member 44 into tubular casing 20 in the manner suggested by FIG. 1, it will be apparent that the spaced-apart parallel side walls 78 intersect the interior side wall 80 of tubular casing 20 in chordally extending relation as illustrated best in FIG. 4. Essentially, these side walls 78 act as partitions to divide the interior region of the tubular casing 20 extending axially between the body 82 of the airflow distributor member 44 and the honeycomb structure 46 into three separate volumes 84, 86, and 88. Side volumes 84 and 86 have D-shaped cross-sectional shapes and enclosed volume 88 is situated between side volumes 84 and 86 as seen best in FIG. 4. Although certain curved wall portions 80a and 80b of interior casing wall 80 do define a portion of the boundary of enclosed volume 88, it will be seen that that boundary is, nevertheless, substantially rectangular in transverse cross section because of the presence of flat side walls 78 even though the enclosed volume 88 is provided inside a cylindrical casing 20 having a circular cross section. It will be appreciated that side walls 78 are aligned to lie in parallel relation to a reference line (not shown) extending between the centers of ports 90 and 74 formed in airflow distributor member 44.

It has been observed that provision of an enclosed volume of substantially rectangular cross section underlying the filters and containing the honeycomb structure operates to minimize reentrainment of liquid into the air stream once the liquid has been separated from the airstream in the first stage filter 26. Advantageously, this benefit is achievable in a cylindrical filter casing 20 because of the use of chordally extending side walls 78 therein in accordance with the present invention to restrict the size and shape of the enclosed volume 88 therebetween.

The chordally extending side walls 78 help to maintain air flowing in the enclosed volume 88 at about a constant velocity as it flows from the exit of the first stage filter 26 toward the entrance of the second stage filter 32. Advantageously, revaporization or reentrainment of water collected in the honeycomb structure 46 into the air stream conducted through enclosed chamber 88 is reduced when the velocity of the air stream flow is substantially constant.

It has been observed that liquid separated from an airstream in a conventional filter assembly having a cylindrical inner wall extending between the filters and the honeycomb structure tends to travel along the cylindrical inner wall in a spiral and enter the second stage filter without first being deposited under gravity into an underlying honeycomb structure. The chordally extending walls 78 act to block any upwardly spiraling travel of liquid on the inner wall defining a boundary of enclosed volume 88 and act as a "funnel" to direct liquid on the inner wall downwardly into the honeycomb structure 46. Advantageously, this funneling feature helps to minimize the amount of liquid entering the second stage filter 32.

Airflow distributor member 44 is also formed to include a bottom-opening inlet port 90, an annular top-opening outlet port 92, and a second stage entrance channel 94 extending therebetween. The inclined contoured shape of the second stage entrance channel 94 is best seen in FIGS. 1 and 3. Channel 94 conducts the compressed air stream from the substantially rectangular enclosed volume 88 to the annular entry face 96 of second stage filter 32 while the droplets are left behind in the honeycomb structure 46. Advantageously, floor 98 in second stage entrance channel 94 is sloped, contoured, and inclined using gently curving contoured surfaces to minimize creation of dead zones and development of eddy currents in channel 94. The surfaces defining first stage exit channel 76 are also sloped, contoured, and inclined to minimize development of unwanted eddy currents therein and to control the velocity of air flow in the enclosed volume 88.

A flow control baffle 100 depends from the underside of the airflow body 82 and extends into enclosed volume 88 as shown best in FIGS. 2 and 4. The baffle 100 operates to direct droplets generated in the first stage filter 26 toward honeycomb structure 46 to keep liquid moving toward drainage port 54 and otherwise control air and water flow in enclosed volume 88. For example, the placement of flow control baffle 100 intermediate outlet port 74 and inlet port 90 helps to keep air moving in a right to left direction in the sectional view shown in FIG. 2 so that air does not swirl about in an unwelcome fashion in the enclosed volume which might lead to revaporization of droplets already separated from the compressed air stream.

Manifold cap 14 is formed to include a set of internal threads 110 which engage the set of external threads 112 formed on the outside wall of cartridge housing 12 to permit a user to connect manifold cap 14 to the top end of cartridge housing 12 after the self-contained filter cartridge 18 has been deposited inside the cartridge housing 12. As shown in FIG. 2, such a threaded connection means is situated to lie in spaced-apart relation to the filter cartridge 18 so that the connection means extends about the filter cartridge 18 upon connection of the manifold cap 14 to the cartridge housing 12. No part of the means employed to connect the manifold cap 14 to the cartridge housing 12 extends through either of filters 26, 32, thereby making a most efficient use of space available inside tubular casing 20 to hold filter elements.

A radially outwardly extending lip 114 on casing lid 22 is interposable between a top edge 116 on cartridge housing 12 and the bottom wall 62 of manifold cap 14 to retain the filter cartridge 18 in a predetermined position suspended in an interior region of the cartridge housing 12 adjacent to the manifold cap 14. In this predetermined position, the first stage filter 26 is directly coupled to the manifold inlet passageway 64 and the exterior wall 117 of tubular casing 20 closely fits against the interior wall 119 of cartridge housing 12 to prevent untreated compressed air from defiling or otherwise attaching to interior walls or components in the cartridge housing 12. Liquid discharged from honeycomb structure 46 through drainage port 54 is dispensed into drain chamber 118 in an axially lower portion of cartridge housing 12. By positioning the filter cartridge 18 in direct communication with the manifold cap 14 as described above, the mechanism inside float drain 120 provided in chamber 118 to control liquid drainage from cartridge housing 12 through drain opening 122 is protected from contaminant build-up caused by exposure to untreated compressed air.

Figures 5, 6:
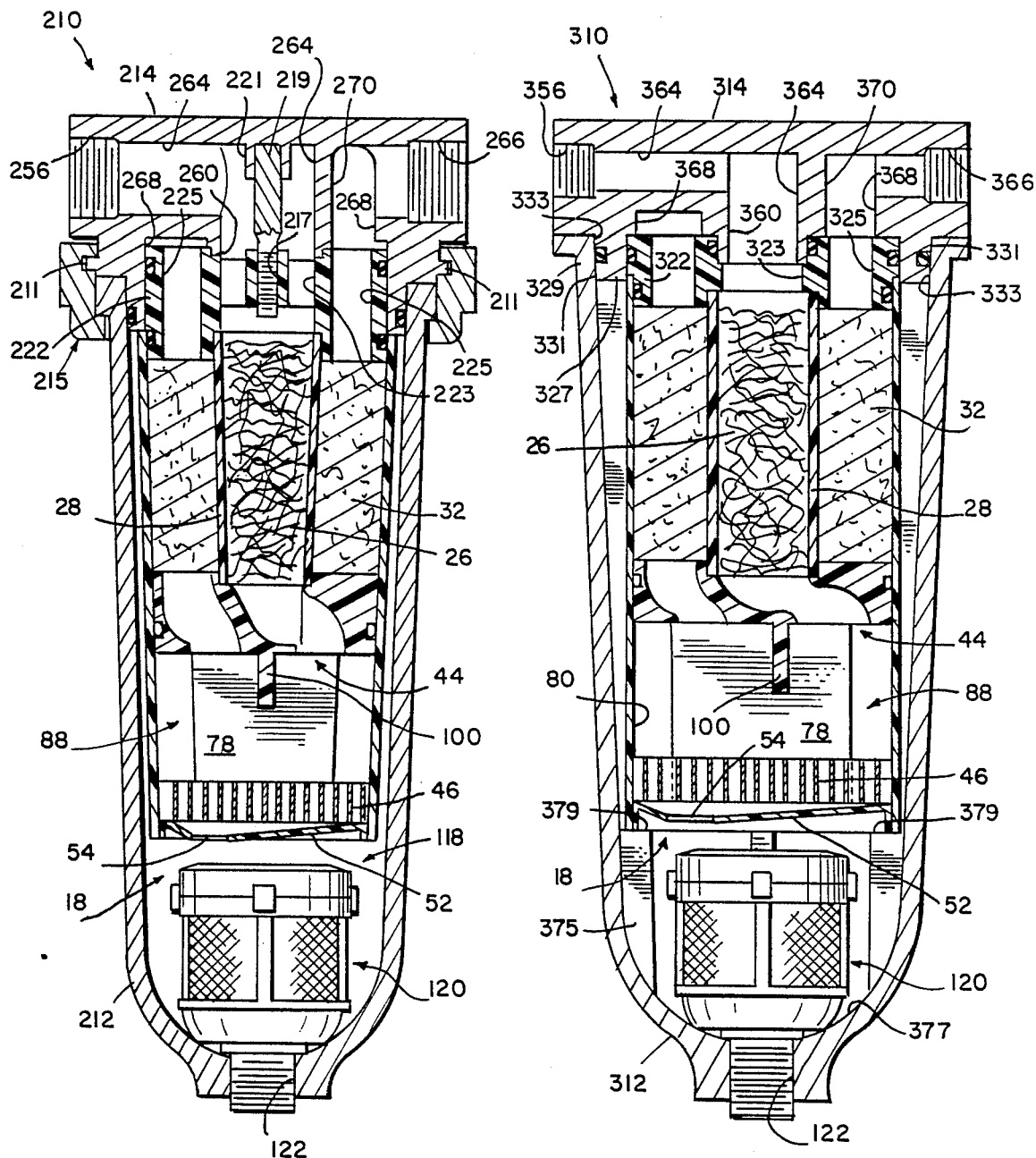
FIG. 5 is a longitudinal sectional view of another embodiment of a filter cartridge assembly in accordance with the present invention.
FIG. 6 is a longitudinal sectional view of yet another embodiment of a filter cartridge assembly in accordance with the present invention.
Figure 7:
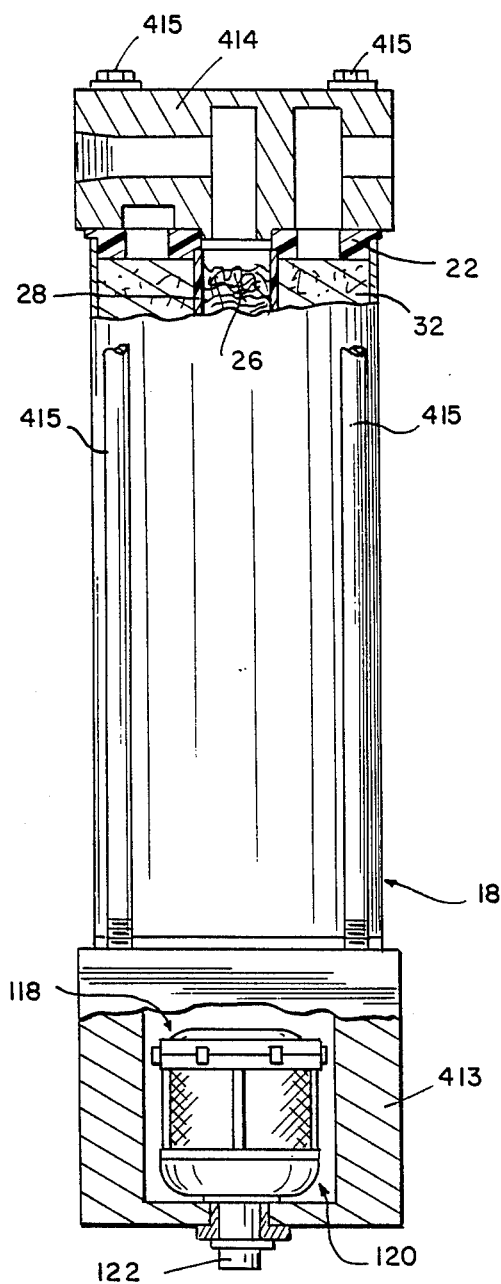
FIG. 7 is a side elevational view, with portions broken away, of still another embodiment of a filter cartridge assembly in accordance with the present invention.

In other embodiments of the invention illustrated in FIGS. 5, 6, and 7, those elements referenced by numbers identical to those in FIGS. 1-4 perform the same or similar function. The embodiments of FIGS. 5-7 relate generally to alternative cartridge housing and manifold cap designs.

In the embodiment of FIG. 5, a filter cartridge assembly 210 having a manifold cap 214 connected to a cartridge housing 212 by means of a spin-on connecting ring 215. Desirably, filter cartridge 212 is a bowl or cylindrical aluminum canister or a polycarbonate shell provided with a scatter shield (not shown). Manifold cap 214 is formed to include inlet opening 256, manifold exit port 260, L-shaped inlet passageway 264 extending between inlet opening 256 and manifold exit port 260, annular manifold entry port 268, outlet opening 266, and outlet passageway 270 extending between annular manifold entry port 268 and outlet opening 266. Manifold 214 includes an exterior rim portion 211 for engaging connecting ring 215.

Filter cartridge 18 includes a casing lid 222 formed to include a central threaded aperture 217 into which the distal end of a threaded bolt 219 is inserted to suspend filter cartridge 18 from the manifold cap 214. The proximal end of threaded bolt 219 is coupled to a fixture 221 provided in inlet passageway 264 as shown in FIG. 5. Casing lid 222 further includes inlet aperture means 223 for conducting an untreated compressed air stream from inlet passageway 264 into first stage filter 26 and outlet aperture means 225 for conducting a filtered compressed air stream from second stage filter 32 into outlet passageway 270.

In the embodiment of FIG. 6, a filter cartridge assembly 310 having a manifold cap 314 to a cartridge housing 312 by means of a is connected press-fit, sealed connection established between a manifold skirt 327 and an upper rim 329 of cartridge housing 312. In particular, the manifold skirt 327 extends downwardly into the interior region of the cartridge housing 312 through the cartridge-receiving opening. The skirt 327 has an exterior wall 331 configured to mate with the interior wall 333 of the rim 329 in close-fitting relation to establish a press-fit connection providing the means of connecting the manifold cap 314 to the cartridge housing 312.

Manifold cap 314 is formed to include inlet opening 356, manifold exit port 360, L-shaped inlet passageway 364 extending between opening 356 and port 360, annular manifold entry port 368, outlet opening 366, and outlet passageway 370 extending between port 368 and opening 366. Casing lid 322 includes inlet aperture means 323 for admitting air from manifold inlet passageway 364 into first stage filter 26 and outlet aperture means 325 for discharging air from second stage filter 32 into manifold outlet passageway 370.

The filter cartridge 18 is supported in its predetermined position aligned with manifold cap 314 by means of upstanding support arms 375 unitarily attached to the interior wall 377 of the cartridge housing 312 in the drain chamber 118 as shown in FIG. 6. Each support arm 375 lies underneath the filter cartridge 18 and includes an axially upwardly facing platform 379 for supporting the filter cartridge 18 in its predetermined position within cartridge housing 312.

The embodiment of FIG. 7 is very similar to the embodiment of FIGS. 1-4 except that four longitudinally extending bolts 415 are used to connect manifold cap 414 to a cartridge housing base 413. Each bolt 415 is positioned outside of filter cartridge 18.

Although the invention has been described in detail with reference to certain preferred embodiments, variations and modifications exist within the scope and spirit of the invention as described and defined in the following claims.

What is claimed is:

1. An apparatus for cleaning a compressed air stream in an air line, the apparatus comprising
 a cartridge housing formed to include an interior region and a cartridge-receiving opening communicating with the interior region,
 a filter cartridge in the interior region of the cartridge housing, the filter cartridge including means for filtering a compressed air stream to remove at least one selected contaminant therefrom, the filtering means including a pair of coaxially aligned filter elements, a first of the filter elements being formed to include a central aperture extending in an axial direction therethrough, and a second of the filter elements being situated in the central aperture,
 a manifold formed to include means interconnecting the air line and the filter cartridge for conducting the compressed air stream in the air line between the air line and the filter cartridge, and
 means for selectively connecting the manifold to the cartridge housing to cover the cartridge-receiving opening and to place the manifold adjacent to the filter cartridge to couple the conducting means to the filtering means, the filter cartridge including a tubular casing having an interior side wall, the filtering means being disposed in an axially upper portion of the casing, and enclosure means underlying the filtering means for defining an enclosed volume situated to conduct air between the first and second filter elements, the enclosure means including a pair of flat axially downwardly extending side walls aligned in spaced-apart parallel relation to intersect the interior side wall in chordally extending relation to define the enclosed volume therebetween.

2. An apparatus for cleaning a compressed air stream in an air line, the apparatus comprising a cartridge housing formed to include an interior region and a cartridge-receiving opening communicating with the interior region, a filter cartridge configured to fit into the interior region of the cartridge housing, the filter cartridge including means for filtering a compressed air stream to remove at least one selected contaminant therefrom, the filtering means including an axially extending filter ring formed to include a central aperture extending in an axial direction therethrough and an axially extending filter element disposed in the central aperture in coaxial alignment with the filter ring, a manifold formed to include means interconnecting the air line and the filter cartridge for diverting the compressed air stream in the air line through the filter cartridge, means for selectively connecting the manifold to the cartridge housing to cover the cartridge-receiving opening, and means for retaining the filter cartridge in a predetermined position in the interior region of the cartridge housing adjacent to the manifold and in spaced-apart relation to the connecting means so that the filtering means of the filter cartridge is in fluid communication with the diverting means of the manifold to permit a compressed air stream diverted from the air line to be cleaned in the filter cartridge, the retaining means being configured to permit removal of the filter cartridge from the interior region of the cartridge housing through the cartridge-receiving opening upon disconnecting the manifold from the cartridge housing, the cartridge housing including an interior side wall defining a boundary of the interior region, the filter cartridge further including a hollow casing containing the filter ring and filter element therein, and the hollow casing including an exterior side wall closely fitted to the interior side wall of the cartridge housing.

3. An apparatus for cleaning a compressed air stream in an air line, the apparatus comprising a cartridge housing formed to include an interior region and a cartridge-receiving opening communicating with the interior region, a filter cartridge configured to fit into the interior region of the cartridge housing, the filter cartridge including means for filtering a compressed air stream to remove at least one selected contaminant therefrom, the filtering means including axially extending first and second stage filters, the second stage filter being configured to encircle the first stage filter and lie in coaxial alignment therewith, a manifold formed to include means interconnecting the air line and the filter cartridge for diverting the compressed air stream in the air line through the filter cartridge, means for selectively connecting the manifold to the cartridge housing to cover the cartridge-receiving opening, and means for retaining the filter cartridge in a predetermined position in the interior region of the cartridge housing adjacent to the manifold and in spaced-apart relation to the connecting means so that the filtering means of the filter cartridge is in fluid communication with the diverting means of the manifold to permit a compressed air stream diverted from the air line to be cleaned in the filter cartridge, the retaining means being configured to permit removal of the filter cartridge from the interior region of the cartridge housing through the cartridge-receiving opening upon disconnecting the manifold from the cartridge housing, the filtering means including means for distributing air from an outlet of the first stage filter to an inlet of the second stage filter and the distributing means being situated in the filter cartridge to underlie both of the first and second stage filters.

4. An apparatus for cleaning a compressed air stream in an air line, the apparatus comprising a cartridge housing formed to include an interior region and a cartridge-receiving opening communicating with the interior region, a filter cartridge configured to fit into the interior region of the cartridge housing, the filter cartridge including means for filtering a compressed air stream to remove at least one selected contaminant therefrom, the filtering means including axially extending first and second stage filters, the second stage filter being configured to encircle the first stage filter and lie in coaxial alignment therewith, a manifold formed to include means interconnecting the air line and the filter cartridge for diverting the compressed air stream in the air line through the filter cartridge, means for selectively connecting the manifold to the cartridge housing to cover the cartridge-receiving opening, and means for retaining the filter cartridge in a predetermined position in the interior region of the cartridge housing adjacent to the manifold and in spaced-apart relation to the connecting means so that the filtering means of the filter cartridge is in fluid communication with the diverting means of the manifold to permit a compressed air stream diverted from the air line to be cleaned in the filter cartridge, the retaining means being configured to permit removal of the filter cartridge from the interior region of the cartridge housing through the cartridge-receiving opening upon disconnecting the manifold from the cartridge ho using, the first stage filter including means for promoting coalescence of vapor in air into droplets, the filtering means further including means for distributing air from an outlet of the first stage filter to an inlet of the second stage filter, and the distributing means including enclosure means for defining an enclosed volume situated to receive air conducted between the first and second stage filters and droplets generated by the promoting means in the first stage filter and porous means in the enclosure means for collecting droplets received in the enclosed volume in a quiet zone of substantially zero air movement to minimize revaporization of droplets into air conducted through the distributing means.

5. The apparatus of claim 4, wherein the filter cartridge includes a tubular casing containing the first and second stage filters and the enclosure means includes a pair of chordally extending flat side walls extending in spaced parallel relation across an interior region of the tubular casing underneath the first and second stage filters to intersect an interior side wall of the tubular casing and divide the interior region of the tubular casing into three separate volumes, including spaced-apart first and second volumes having D-shaped cross-sectional shapes, and a third volume having a substantially rectangular cross-sectional shape therebetween, and only the third volume communicates with the filtering means to provide said enclosed volume.

6. An apparatus for cleaning a compressed air stream, the apparatus comprising
 a manifold formed to include a manifold exit port, inlet channel means communicating with the manifold exit port for admitting air to be cleaned into the manifold, a manifold entry port, and outlet channel means communicating with the manifold entry port for discharging cleaned air from the manifold,
 a cartridge housing formed to include an interior region and a cartridge-receiving opening communicating with the interior region,
 means for releasably connecting the cartridge housing to the manifold so that the cartridge-receiving opening in the cartridge housing communicates with the manifold exit and entry ports,
 a filter cartridge removably disposed in the interior region of the cartridge housing, the filter cartridge being formed to include inlet aperture means for admitting air to be cleaned into the filter cartridge from the manifold exit port and outlet aperture means for discharging cleaned air from the filter cartridge into the manifold entry port, the filter cartridge including means for filtering air in the filter cartridge, the filtering means interconnecting the inlet aperture means and the outlet aperture means in fluid communication to define an internal passage inside the filter cartridge configured to conduct air through the filter cartridge between the inlet and outlet aperture means, and
 means for coupling the filter cartridge to the manifold to maintain the filter cartridge in a predetermined position in the cartridge housing abutting the manifold so that the inlet aperture means in the filter cartridge is aligned to confront the manifold exit port to permit air to flow directly from the manifold into the internal passage of the filter cartridge and the outlet aperture means in the filter cartridge is aligned to confront the manifold entry port to permit air to flow directly from the internal passage of the filter cartridge into the manifold.

7. The apparatus of claim 6, wherein the manifold includes a bottom wall formed to include a central opening defining the manifold exit port and an outer opening surrounding a perimeter boundary of the manifold exit port to define the manifold entry port.

8. The apparatus of claim 7, wherein the bottom wall is configured to give the central opening a circular shape and the outer opening a ring shape and the ring-shaped outer opening is coaxially aligned with the circular-shaped central opening.

9. The apparatus of claim 7, wherein the manifold further includes an axially extending skirt depending from the bottom wall to define a filter cartridge-receiving space opening toward the cartridge housing and the filter cartridge extends into the filter cartridge-receiving space to engage the bottom wall of the manifold.

10. The apparatus of claim 7, wherein the filtering means includes an axially extending first stage filter having an inlet situated to lie in close proximity to the manifold exit port and an axially extending second stage filter surrounding a side wall of the first stage filter to lie in coaxial alignment therewith and having an outlet situated to lie in close proximity to the manifold entry port.

11. The apparatus of claim 10, wherein the filter cartridge further includes screen means intermediate the manifold and the second stage filter for collecting selected contaminant material discharged through the second stage filter outlet to prevent such material from entering the manifold via the manifold entry port.

12. The apparatus of claim 10, wherein the filtering means further includes means for distributing air from an outlet of the first stage filter to an inlet of the second stage filter and the distributing means is situated in the filter cartridge to underlie both of the first and second stage filters.

13. The apparatus of claim 10, wherein the first stage filter includes means for promoting coalescence of vapor in air into droplets, the filtering means further includes means for distributing air from an outlet of the first stage filter to an inlet of the second stage filter, and the distributing means includes enclosure means for defining an enclosed volume situated to receive air conducted between the first and second stage filters and droplets generated by the promoting means in the first stage filter, and porous means in the enclosure means for collecting droplets received in the enclosed volume in a quiet zone of substantially zero air movement to minimize revaporization of droplets into air conducted through the distributing means.

14. The apparatus of claim 13, wherein the filter cartridge includes a tubular casing containing the first and second stage filters and the enclosure means includes a pair of chordally extending flat side walls extending in spaced parallel relation across an interior region of the tubular casing underneath the first and second stage filters to intersect an interior side wall of the tubular casing and divide the interior region of the tubular casing into three separate volumes, including spaced-apart first and second volumes having D-shaped cross-sectional shapes, and a third volume having a substantially rectangular cross-sectional shape therebetween, and only the third volume communicates with the filtering means to provide said enclosed volume.

15. The apparatus of claim 6, wherein the coupling means includes means for suspending the filter cartridge in its predetermined position from the manifold.

16. An apparatus for cleaning a compressed air stream, the apparatus comprising
 a manifold formed to include a manifold exit port, inlet channel means communicating with the manifold exit port for admitting air to be cleaned into the manifold, a manifold entry port, and outlet channel means communicating with the manifold entry port for discharging cleaned air from the manifold.

a cartridge housing formed to include an interior region and a cartridge-receiving opening communicating with the interior region, means for releasably connecting the cartridge housing to the manifold so that the cartridge-receiving opening in the cartridge housing communicates with the manifold exit and entry ports, a filter cartridge removably disposed in the interior region of the cartridge housing, the filter cartridge being formed to include inlet aperture means for admitting air to be cleaned into the filter cartridge from the manifold exit port and outlet aperture means for discharging cleaned air from the filter cartridge into the manifold entry port, the filter cartridge including means for filtering air in the filter cartridge, the filtering means interconnecting the inlet aperture means and the outlet aperture means in fluid communication to define a passage configured to conduct air through the filter cartridge, and means for coupling the filter cartridge to the manifold to maintain the filter cartridge in a predetermined position in the cartridge housing abutting the manifold so that the inlet aperture means in the filter cartridge is aligned to confront the manifold exit port to permit air to flow directly from the manifold into the filter cartridge and the outlet aperture means in the filter cartridge is aligned to confront the manifold entry port to permit air to flow directly from the filter cartridge into the manifold, the cartridge housing including an axially extending interior side wall forming a boundary of the interior region, the filter cartridge including a casing containing the filtering means therein and having an axially extending exterior side wall abutting the interior side wall of the cartridge housing.

17. The apparatus of claim 16, wherein the interior side wall of the cartridge housing and the exterior side wall of the casing each have a cylindrical shape, and the casing is slidably received in the cartridge housing in telescoping relation to cause the exterior side wall of the casing to fit closely with the interior side wall of the cartridge housing upon disposition of the filter cartridge into the cartridge housing.

18. An apparatus for cleaning a compressed air stream, the apparatus comprising a manifold formed to include a manifold exit port, inlet channel means communicating with the manifold exit port for admitting air to be cleaned into the manifold, a manifold entry port, and outlet channel means communicating with the manifold entry port for discharging cleaned air from the manifold, a cartridge housing formed to include an interior region and a cartridge-receiving opening communicating with the interior region, means for releasably connecting the cartridge housing to the manifold so that the cartridge-receiving opening in the cartridge housing communicates with the manifold exit and entry ports, a filter cartridge removably disposed in the interior region of the cartridge housing, the filter cartridge being formed to include inlet aperture means for admitting air to be cleaned into the filter cartridge from the manifold exit port and outlet aperture means for discharging cleaned air from the filter cartridge into the manifold entry port, the filter cartridge including means for filtering air in the filter cartridge, the filtering means interconnecting the inlet aperture means and the outlet aperture means in fluid communication to define a passage configured to conduct air through the filter cartridge, and means for coupling the filter cartridge to the manifold to maintain the filter cartridge in a predetermined position in the cartridge housing abutting the manifold so that the inlet aperture means in the filter cartridge is aligned to confront the manifold exit port to permit air to flow directly from the manifold into the filter cartridge and the outlet aperture means in the filter cartridge is aligned to confront the manifold entry port to permit air to flow directly from the filter cartridge into the manifold, the filter cartridge further including a casing containing the filtering means therein and a lid attached to the casing, the lid being formed to include the inlet aperture means and the outlet aperture means, and the coupling means including a radially outwardly extending lip on the lid trapped between an edge of the cartridge ho using and the manifold to suspend the filter cartridge in its predetermined position in the interior region of the cartridge housing.

19. An apparatus for cleaning a compressed air stream, the apparatus comprising a manifold formed to include a manifold exit port, inlet channel means communicating with the manifold exit port for admitting air to be cleaned into the manifold, a manifold entry port, and outlet channel means communicating with the manifold entry port for discharging cleaned air from the manifold, a cartridge housing formed to include an interior region and a cartridge-receiving opening communicating with the interior region, means for releasably connecting the cartridge housing to the manifold so that the cartridge-receiving opening in the cartridge housing communicates with the manifold exit and entry ports, a filter cartridge removably disposed in the interior region of the cartridge housing, the filter cartridge being formed to include inlet aperture means for admitting air to be cleaned into the filter cartridge from the manifold exit port and outlet aperture means for discharging cleaned air from the filter cartridge into the manifold entry port, the filter cartridge including means for filtering air in the filter cartridge, the filtering means interconnecting the inlet aperture means and the outlet aperture means in fluid communication to define a passage configured to conduct air through the filter cartridge, and means for coupling the filter cartridge to the manifold to maintain the filter cartridge in a predetermined position in the cartridge housing abutting the manifold so that the inlet aperture means in the filter cartridge is aligned to confront the manifold exit port to permit air to flow directly from the manifold into the filter cartridge and the outlet aperture means in the filter cartridge is aligned to confront the manifold entry port to permit air to flow directly from the filter cartridge into the manifold, the coupling means including at least one support arm unitarily attached to an interior wall of the cartridge housing to lie underneath the filter cartridge, the at least one support arm including platform means for supporting the filter cartridge in its predetermined position in the cartridge housing.

20. An apparatus for cleaning a compressed air stream, the apparatus comprising a filter cartridge including means for promoting coalescence of vapor in the compressed air stream into droplets to demoisturize the compressed air stream, means for decontaminating the demoisturized compressed air stream to remove selected contaminants entrained therein, and means intermediate the promoting means and the decontaminating means for discharging droplets from the filter cartridge, a cartridge housing including an interior wall configured to define an interior region and a cartridge-receiving opening communicating with the interior region, means for releasably supporting the filter cartridge in the interior region of the cartridge housing so that droplets exhausted from the filter cartridge collect in a bottom portion of the cartridge housing underlying the filter cartridge and the filter cartridge is removable from the interior region of the cartridge housing through the cartridge-receiving opening, means in the bottom portion of the cartridge housing for draining droplets collected in the bottom portion from the cartridge housing, and manifold means communicating with the filter cartridge for diverting a compressed air stream directly into the promoting means in the filter cartridge to ensure that the compressed air stream is treated by the promoting means and the decontaminating means before it is one of exposed to the interior wall of the cartridge housing and communicated to the draining means in the cartridge housing or both so that moisture and contaminant buildup on the interior wall of the cartridge housing and in the draining means is minimized.

21. The apparatus of claim 20, wherein the promoting means is formed to include an inlet and the manifold means is formed to include an inlet channel conducting air to be cleaned from a compressed air stream directly into the inlet of the promoting means without passing through a space intermediate the interior wall of the cartridge housing and an exterior wall of the filter cartridge.

22. The apparatus of claim 21, wherein the manifold includes a bottom wall formed to include a manifold exit port communicating with the inlet channel, the filter cartridge includes a lid formed to define the inlet of the promoting means, and the supporting means positions the lid of the filter cartridge in engagement with the bottom wall of the manifold to align the manifold exit port and the inlet of the promoting means in mutually confronting relation.

23. The apparatus of claim 20, wherein the decontaminating means includes an axially extending filter ring formed to include a central aperture extending in an axial direction therethrough and the promoting means includes an axially extending tubular filter element disposed in the central aperture in coaxial relation to the filter ring.

24. The apparatus of claim 23, wherein the filter cartridge includes a hollow casing containing the filter ring and tubular filter element therein and the hollow casing includes an exterior side wall closely fitted to the interior side wall of the cartridge housing upon insertion of the filter cartridge into the interior region of the cartridge housing through the cartridge-receiving opening.

25. An apparatus for cleaning a compressed air stream in an air line, the apparatus comprising a housing formed to include an interior region, a manifold coupled to the housing and formed to include means for conducting the compressed air stream in the air line between the air line and the interior region of the housing, and means in the interior region for filtering a compressed air stream introduced into the interior region via the manifold to remove at least one selected contaminant therefrom, the filtering means including a first stage filter element, a second stage filter element, and means for distributing air from an outlet of the first stage filter element to an inlet of the second stage filter element, the distributing means being situated in the interior region of the housing to underlie both of the first and second stage filter elements and further include enclosure means for defining an enclosed volume in the interior region of the housing to receive air conducted between the first and second stage filter elements and an airflow distributor member situated below the first and second stage filter elements and above the enclosure means, and the airflow distributor member is formed to include a first stage exit channel extending therethrough to interconnect the outlet of the first stage filter element and the enclosed volume in fluid communication so that compressed air stream is conducted from the first stage filter element into the enclosed volume via the first stage exit channel and a second stage entrance channel extending therethrough to interconnect the enclosed volume and the inlet of the second stage filter element in fluid communication so that the compressed air stream is conducted from the enclosed volume into the second stage filter element via the second stage entrance channel.

26. The apparatus of claim 25, wherein the second stage filter element is an elongated, ring-shaped member and is formed to include having an annular inlet opening at one end thereof, the airflow distributor member is formed to include an annular, top-opening outlet port in coaxial registry with the annular inlet opening of the filter ring to permit the compressed air stream to pass from the airflow distributor member into the second stage filter element, and the airflow distributor member is also formed to include a bottom-opening inlet port communicating with the enclosed volume and connected to the top-opening outlet port via the second stage entrance channel extending through the airflow distributor member.

27. The apparatus of claim 26, wherein the airflow distributor member further includes a radially inwardly facing, cylindrical side wall, a radially outwardly facing, cylindrical side wall coaxially arranged in spaced-apart relation relative to the radially inwardly facing cylindrical side wall to define a ring-shaped space therebetween, and an inclined contoured surface disposed in the ring-shaped space between the cylindrical side walls to provide a bottom wall of the second stage entrance channel, the inclined contoured surface includes a perimetrically extending outer edge coupled to the radially inwardly facing cylindrical side wall and a perimetrically extending inner edge coupled to the radially outwardly facing cylindrical side wall, and the inclined contoured surface is formed to include the bottom-opening inlet port.

28. The apparatus of claim 25, wherein the airflow distributor member includes a radially inner cylindrical member formed to include a top-opening central inlet port connected to the outlet of the first stage filter element, a radially outer cylindrical member surrounding the radially inner cylindrical member in coaxial alignment therewith so that an exterior surface of the radially inner cylindrical member lies in spaced-apart relation to an interior surface of the radially outer cylindrical member to define a ring-shaped space therebetween, and an inclined contoured surface disposed in the ring-shaped space between the radially outer and inner cylindrical members to provide a bottom wall of the second stage entrance channel.

29. The apparatus of claim 28, wherein the coaxially aligned radially outer and inner cylindrical members cooperate to define a top-opening annular inlet opening therebetween connected to the inlet of the second stage filter element, and the inclined contoured surface is formed to include a bottom-opening inlet port communicating with the enclosed volume so that the compressed air stream is conducted from the enclosed volume into the second stage filter element through the second stage entrance channel extending between the bottom-opening inlet port and the top-opening outlet port of the airflow distributor member.

30. The apparatus of claim 28, wherein the airflow distributor member is formed to include a bottom-opening outlet port arranged in radially outwardly offset relation to the top-opening central inlet port and in close proximity to a radially outermost edge of the airflow distributor member, and the first steps exit channel interconnects the top-opening central inlet port and the bottom-opening outlet port and has an S-shaped transverse cross section so that the compressed air stream is conducted along an S-shaped path through the first stage exit channel from the top opening central inlet port to the offset radially outer bottom-opening outlet port.

31. An apparatus for cleaning a compressed air stream in an air line, the apparatus comprising
a housing formed to include an interior region,
a manifold coupled to the housing and formed to include means for conducting the compressed air stream in the air line between the air line and the interior region of the housing, and
means in the interior region for filtering a compressed air stream introduced into the interior region via the manifold to remove at least one selected contaminant therefrom, the filtering means including a first stage filter element, a second stage filter element, and means for distributing air from an outlet of the first stage filter element to an inlet of the second stage filter element, the distributing means being situated in the interior region of the housing to underlie both of the first and second stage filter elements and wherein,
the housing further includes a tubular casing having an interior side wall, the filtering means is disposed in an axially upper portion of the casing, and the distributing means includes a pair of flat axially downwardly extending side walls aligned in spaced-apart parallel relation to intersect the interior side wall in chordally extending relation to define an enclosed volume therebetween through which the compressed air stream passes as it is conducted from the first stage filter element to the second stage filter element.

32. An apparatus for cleaning a compressed air stream in an air line, the apparatus comprising
a housing formed to include an interior region,
a manifold coupled to the housing and formed to include means for conducting the compressed air stream in the air line between the air line and the interior region of the housing, and
means in the interior region for filtering a compressed air stream introduced into the interior region via the manifold to remove at least one selected contaminant therefrom, the filtering means including a first stage filter element, a second stage filter element, and means for distributing air from an outlet of the first stage filter element to an inlet of the second stage filter element, the distributing means being situated in the interior region of the housing to underlie both of the first and second stage filter elements, and wherein
the housing further includes an interior side wall defining a boundary of the interior region, the filtering means includes a hollow casing containing the first and second stage filters therein, and the hollow casing includes an exterior side wall closely fitted to the interior side wall of the housing.

* * * * *